(12) United States Patent
Huang

(10) Patent No.: US 9,774,506 B2
(45) Date of Patent: Sep. 26, 2017

(54) METHOD AND APPARATUS FOR ANALYSIS OF THE OPERATION OF A COMMUNICATION SYSTEM USING EVENTS

(75) Inventor: Yangcheng Huang, Athlone (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 429 days.

(21) Appl. No.: 13/807,912

(22) PCT Filed: Jun. 29, 2010

(86) PCT No.: PCT/EP2010/059205
§ 371 (c)(1),
(2), (4) Date: Mar. 14, 2013

(87) PCT Pub. No.: WO2012/000540
PCT Pub. Date: Jan. 5, 2012

(65) Prior Publication Data
US 2013/0179568 A1 Jul. 11, 2013

(51) Int. Cl.
*H04L 12/26* (2006.01)
*H04L 12/24* (2006.01)

(52) U.S. Cl.
CPC ........... *H04L 43/04* (2013.01); *H04L 41/064* (2013.01)

(58) Field of Classification Search
CPC .............................. H04L 43/04; H04L 41/064
USPC ....................................................... 709/224
See application file for complete search history.

(56) References Cited

U.S. PATENT DOCUMENTS

| | | | |
|---|---|---|---|
| 7,107,496 B1* | 9/2006 | D'Ippolito | H04L 41/0631 714/43 |
| 7,568,045 B1* | 7/2009 | Agrawal | H04L 41/142 709/223 |
| 7,889,666 B1* | 2/2011 | Pei et al. | 370/242 |
| 8,407,170 B2* | 3/2013 | Harrison et al. | 706/45 |
| 8,463,899 B2* | 6/2013 | Scarpelli et al. | 709/224 |
| 2002/0111755 A1* | 8/2002 | Valadarsky | H04L 41/0604 702/58 |
| 2002/0114277 A1* | 8/2002 | Kyusojin | H04L 12/2602 370/230.1 |

(Continued)

OTHER PUBLICATIONS

International Search Report for PCT/EP2010/059205 dated Sep. 17, 2010.

(Continued)

*Primary Examiner* — Backhean Tiv
(74) *Attorney, Agent, or Firm* — Baker Botts, LLP

(57) ABSTRACT

The present invention relates to a method and apparatus for event analysis in a communication (telecommunication or computer) system. In particular, the invention relates to a method and apparatus for analyzing events representing activity in the communication system. Embodiments provide a progressive technique for the analysis of the operation of a communication system. Embodiments provide a bottom-up approach by first detecting burst of events, and establishing causal relationships between events and system operation reports using detected event burst records representing the occurrence of burst behaviors in events in a system. Based on the causal relationships found, causes of a change in system operation may be identified by determining parameters associated with events of an event burst relevant to the change in system operation.

17 Claims, 12 Drawing Sheets

(56) References Cited

U.S. PATENT DOCUMENTS

| | | | | |
|---|---|---|---|---|
| 2005/0188240 A1* | 8/2005 | Murphy | ............ | G06F 11/0709 |
| | | | | 714/4.4 |
| 2007/0121674 A1* | 5/2007 | Chen et al. | .................. | 370/468 |
| 2008/0037432 A1* | 2/2008 | Cohen | .................. | H04L 41/142 |
| | | | | 370/241 |
| 2010/0052924 A1* | 3/2010 | Bajpay | ............... | H04L 41/0631 |
| | | | | 340/635 |
| 2013/0179568 A1* | 7/2013 | Huang | ................... | H04L 43/04 |
| | | | | 709/224 |

OTHER PUBLICATIONS

"Complex Event Processing", Creative Commons Attribution-Share Alike, 3.0, 6 pages.
J. Kleinberg, "Bursty and Hierarchial Structure in Streams", Proceedings of the 8th ACM SIGKDD International Conference on Knowledge Discovery and Data Mining, 2002, 25 pages.
M. Vlachos et al., "Correlating Bursts on Streaming Stock Market Data", IBM T.J. Watson Research Center, Published online Mar. 9, 2007, Springer Science & Business Media, LLC 2007, pp. 109-133.
"Moving Average", Creative Commons Attribution-Share Alike 3.0, 7 pages.
First Office Action issued by the State Intellectual Property Office, P.R. China for Patent Application No. 201080067862.6, dated Dec. 23, 2014.

* cited by examiner

METHOD AND APPARATUS FOR ANALYSIS OF THE OPERATION OF A COMMUNICATION SYSTEM USING EVENTS

This application is the U.S. national phase of International Application No. PCT/EP2010/059205 filed 29 Jun. 2010 which designated the U.S., the entire contents of which is hereby incorporated by reference.

TECHNICAL FIELD

The present invention relates to a method and apparatus for event analysis in a communication (telecommunication or computer) system. In particular, the invention relates to a method and apparatus for analysing events representing activity in the communication system.

BACKGROUND

This invention relates to the analysis of events in a communication system. In following description, an event is an object that represents activity in a communication system. An event is not merely a message but may also contain related data, for example a parameter describing the activity that the event represents. Typically, an event might be represented by a data structure having an event id, to identify the event; event type field, which defines the type of event; an event timing field, which defines the time at which the event occurred; and optionally an event parameter field, which contains further information about the activity the event represents. Events have the same relationships to one another, for example the relative timing of events or a causal relationship between events, as the activities represented by the events.

In some embodiments, the term event relates to Operation & Maintenance (O&M) events, e.g. objects carrying information about O&M occurrences, in a communication system. In an exemplary mobile radio communication system, one definition of an event is:

An object or signal carrying information about any discernable occurrence that has significance for the management of the mobile radio infrastructure or the delivery of service and evaluation of the impact a deviation might cause to the services.

Events may be used to monitor network and service performance, and provide statistics for a network operator to analyze the operation of the network. In particular, an event based application processing events generated by the communication system may provide: important statistical indicators of the network performance in real time; as well as solutions for long time storage of detailed network statistics; and information enabling detailed trouble-shooting of the network.

Monitoring the occurrence of a burst of events representing O&M activities of communication systems is significant since detection of an event burst can be very useful in spotting system problems or bottlenecks.

In general, a burst of events is considered to occur when the frequency of occurrence of that event in a data stream rises significantly, relative to the normal frequency of occurrence, within a short time period, and may last for a certain period. A temporary pulse of events may be caused by many factors and is unlikely to indicate the existence of a problem or a deterioration in user service experience.

When considering time-series data, such as events in a communication system, one important indicator of change in the communication system is the presence of bursts of events. In particular, depending on the volume and the triggers, an excessive number of events with failure code parameters may be a valid indication of failures in the nodes or links between nodes of the system, and an excessive number of non-failure events, e.g. without failure code parameters, may indicate changes in a system, such as congestions, before any failure occurrences. Therefore, the identification of bursts can provide useful insights about a change in the monitored service quality and/or network performance, allowing the operators to act in a timely manner to make an informed decision.

However, reliable detection of event burst behaviour that is indicative of an event burst occurrence in communication systems has the following challenges:

Firstly, it is generally recognized that network access and service usage can vary widely when considered over different timescales. This leads to the frequency of event occurrence varying significantly when measured over different time periods.

In addition, different types of events have varied occurrence behavior, and different degrees of significance. Some types of events may occur more frequently than others and with more normal variability and therefore it is not possible to determine the burst behavior of events by simply counting and comparing the absolute number of occurrences of each event.

Finally, event processing may impose significant performance requirements since mobile radio systems and/or fixed IP networks may generate a high-volume of events, for example at a rate of 60 k events per second. Handling such a high volume of events requires high performance applications with as little storage space and memory consumption as possible.

Existing event processing methods in mobile radio systems or fixed networks include:

A first method of event processing relies on calculating a simple success/fail ratio and is the most straightforward way of event processing. For example to determine an attach success ratio the number of successful attach attempts is divided by the total number of attach events, as shown:

$$AttachSuccessRatioSGSN\ [\%] = \frac{\text{Number of successful Attach attempts}}{\text{Total number of Attach attempts}} \times 100$$

Although simple, ratio calculation only provides a summarized view of service performance and the calculated results can be misleading. In particular, the frequency of occurrence of events is naturally variable and calculating average failure or success ratio may lead to identical results for events with different levels of event occurrence variability.

A second method of event processing relies on defining and configuring one or more counters. When processing events, different counters are updated depending on the processed events. At regular points, controlled by a granularity period parameter, the counter values are sampled, collected in a report and reset. These reports are subsequently output as separate files. The set of counters to be calculated is manually selected. It is possible to apply filters, for example, to only count the number of events with a certain parameter set to a certain value. Filter criteria can be single value criteria or multi-value criteria, in which the filter passes the event if any value in the multi-value list matches against the specific event parameter.

In order to monitor events for each attribute value (for example, unsuccessful attach events with cause code 13), one counter can be created for each selected filter value (e.g. distribution).

Counter based analysis approaches, although popular, have their inherent constraints.

First, it may not be possible to correlate the results from different counters in the system on session basis since typically counters lack good correlation characteristics. It is difficult to create service quality measurement and carry out problem diagnosis based on counters.

Second, counter based event analysis introduces bottlenecks for the system. Scalability in storage and processing is one of the most challenging issues of event based applications. The values of the counters are meaningless unless they are further analyzed, requiring additional processing resources. By selecting distribution over several attribute values in multiple attributes, the total number of counters created is the product of the number of filter values for each attribute. This can create a very large number of counters from a single monitor, leading to significant complexity when problem diagnosis is carried out.

Third, typically the counters are calculated based on fixed intervals, for example at interval values of 5, 15, 30 and 60 minutes. On the one hand, burst detection requires fairly short intervals between counter calculations since even a 5 minute interval when an event burst occurs may impact the accuracy of problem analysis. However, the shorter the fixed interval, the more data is produced by the counter, which imposes further storage & processing overhead on the systems. In many arrangements it is very hard to select a counter interval that balances granularity and the storing and processing overhead in counter based approaches.

A third method is complex event processing (CEP), which is primarily an event processing concept that processes multiple events with the goal of identifying the meaningful events within the event cloud using techniques such as detection of complex patterns of many events, event correlation and abstraction, event hierarchies, and relationships between events such as causality, membership, and timing, and event-driven processes.

However, existing complex event processing methods in event causality & pattern discovery are mainly manually based. Considering the nature of the events in mobile radio systems and fixed IP networks, it might be very difficult to manually define and maintain rules and policies for event correlation.

Burst detection methods have been used in financial markets contexts. Burst detection approaches proposed for financial and stock markets treat events as news, messages or any other information formats. Events in such contexts are not suitable for analysis of the operation of a communication system, or for fault diagnosis in a communication system.

SUMMARY

In accordance with one aspect of the invention, there is provided a method of analysis of operation of a communication system using events representing activity in the system. In a first step of the method bursts of events are detected. In a second step of the method, the detected bursts of events and system operation information are used in a causal relationship processing step to identify at least one significant event burst causing change in system operation. In a third step, causes of the change in system operation are determined from information associated with events within the significant event burst.

In accordance with a second aspect of the invention, there is provided an analyzer for operation of a communication system using events representing activity in the system. The analyzer has a burst analysis unit for receiving a plurality of events representing activity in the system and for detecting bursts of events, and generating corresponding event burst records. The analyzer also has a causal relationship unit arranged to receive the event burst records and system operation information and to use the event burst records and system operation information in a causal relationship processing step to identify at least one significant event burst causing change in system operation. The analyzer also has a cause analysis unit coupled to the causal relationship unit, the cause analysis unit determining causes of the change in system operation from information associated with events within the significant event burst.

In accordance with a third aspect of the invention, there is provided a communication system node having an operation analyzer, the operation analyzer comprising at least one of an element burst analysis unit, a causal relationship unit, and a cause analysis unit. An element burst analysis unit is arranged to receive a plurality of events representing activity in the system and to detect bursts of events and generating corresponding event burst records, and is coupled to a causal relationship unit to provide event burst records to a causal relationship unit. A causal relationship unit is coupled to an element burst analysis unit and arranged to receive therefrom event burst records and also arranged to receive system operation information and arranged to use the event burst records and system operation information in a causal relationship processing step to identify at least one significant event burst causing change in system operation, and to provide corresponding relevant event burst records to a cause analysis unit. A cause analysis unit is coupled to a causal relationship unit to receive significant event burst records, and arranged to determine one or more causes of a change in system operation from information associated with events within the significant event burst records.

BRIEF DESCRIPTION OF THE DRAWINGS

The invention will now be described by way of example with reference to the accompanying drawings.

DETAILED DESCRIPTION

Embodiments provide a progressive technique for the analysis of the operation of a communication system. Embodiments provide a bottom-up approach by first detecting burst of events, and establishing causal relationships between events and system operation reports using detected event burst records representing the occurrence of burst behaviors in events in a system; and based on the causal relationships found, identifying causes of a change in system operation by determining parameters associated with events of an event burst relevant to the change in system operation.

In some embodiments event parameters, for example failure codes (and sub failure codes) or event IDs (or any other parameters that are capable of grouping events with similar characteristics), may be used to identify service problems or potential service problems in the system.

In the description of the exemplary embodiment, failure codes and sub failure codes are used as event parameters for analysing a root cause of a service problem. However, it will be appreciated by a skilled person that the proposed methods in cause analysis are applicable to other event parameters and other information associated with events and that the use of failure codes and sub-failure codes are not required for all embodiments. In particular, embodiments may be used to determine causes of change in network operation in scenarios before any failures actually occur.

Thus for example for a base station near a football field, the attach event may have a burst occurrence when there are football matches as a result of the increase of football fan attendance. The load of the base station would increase and may lead to increased delay for mobile broadband services.

A suitable implementation of an embodiment of this invention would enable burst occurrence of attach events to be linked with the change in network operation leading to a change in the service provision. In this situation event bursts are occurring even though there has been no failure yet.

An exemplary embodiment will now be described with reference to the accompanying drawings. Although the exemplary embodiment is implemented within a mobile radio system, it will be appreciated that different embodiments may be implemented in many different types of network, including both fixed networks and mobile radio systems.

Figure 1:
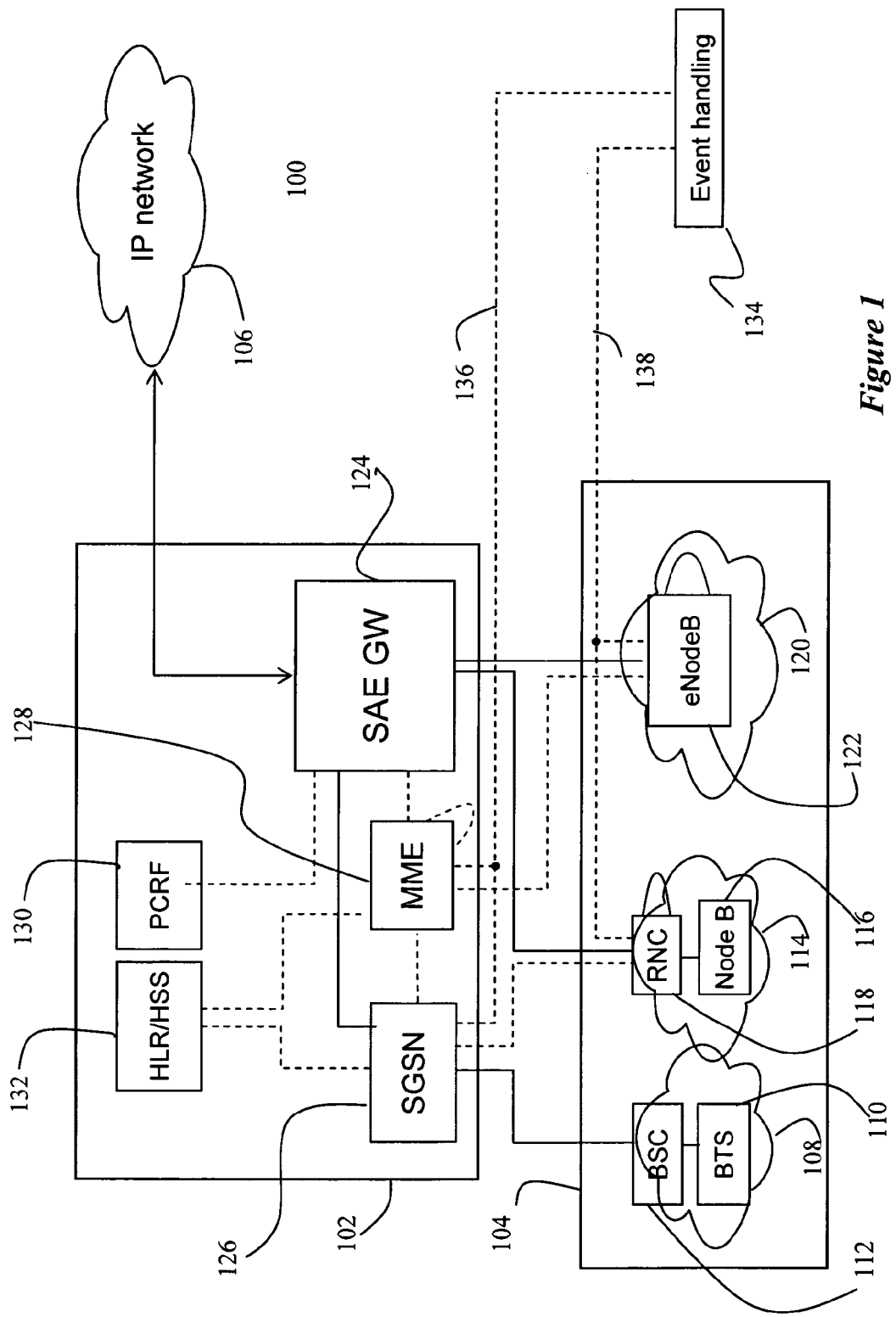
FIG. 1 is a block diagram of an exemplary system in which embodiments of the invention may be implemented.

FIG. 1 is a diagram showing a communication system in which embodiments of the invention may be implemented. The solid line connections between elements in the system of FIG. 1 represent traffic or data connections while the dashed lines represent signaling connections, as will be apparent to a skilled person from a study of FIG. 1.

The network arrangement in FIG. 1 provides a communication system 100 comprising a radio access network 102 and a core network 104 that provide communication services for user equipment (not shown). The core network 104 may be connected to an Internet Protocol (IP) network 106.

The radio access network 102 is arranged to provide an air interface over which user equipment can access the core network 104. Many different air interface technologies are available, and different air interface technologies may be included as part of a communication system, as will be appreciated by a skilled person. In the exemplary arrangement shown in FIG. 1 a Global System for Mobile Communication (GSM) network 108 having an exemplary base transceiver station (BTS) 110 and base station controller (BSC) 112; a $3^{rd}$ Generation Universal Mobile Telecommunication System (3G UMTS) network 114 having an exemplary Node B 116 and Radio Network Controller (RNC) 118; and a Long Term Evolution (LTE) network 120 having an exemplary enhanced Node B (eNode B) 122 are shown in the radio access network 102.

The core network 104 is arranged to provide call routing and call management functions for communications to and from user equipment (not shown) supported by the radio access network 102. The exemplary core network 104 is based on a system architecture evolution (SAE) arrangement and has a System Architecture Evolution gateway (SAE GW) 124 which provides a traffic routing function and is coupled to the IP network 106 and to the exemplary eNode B 122 and the exemplary Radio Network Controller (RNC) 118. In addition, the SAE gateway (SAE GW) 124 is coupled to the exemplary base station controller (BSC) 112 via a Serving GPRS (General Packet Radio Service) Support Node (SGSN) 126.

The core network 104 has a mobility management entity (MME) 128 is coupled to the SAE gateway (SAE GW) 124, Serving GPRS (General Packet Radio Service) Support Node (SGSN) 126, and enhanced Node B (eNode B) 122 to provide user equipment mobility management functions.

The core network 104 has a 3GPP Policy and Charging Rules Function (PCRF) 130 coupled with the SAE gateway 124 to control the interaction of users, user groups and applications with the communication system.

The core network 104 has a Home Location Register/Home Subscriber Server (HLR/HSS) 132 coupled with the Serving GPRS (General Packet Radio Service) Support Node (SGSN) 126 and the mobility management entity (MME) 128, which provides a subscriber location and registration function.

The operation of the network shown in FIG. 1 will be familiar to a skilled person in the light of the corresponding standards, and is not directly relevant to the operation of the invention. As a result, the operation of the networks shown in FIG. 1 will not be explained in any further detail in the following description.

As shown in FIG. 1, an event handling module 134 in accordance with embodiments of the invention is provided. Although the event handling module 134 is shown separately in FIG. 1 for clarity, in different embodiments the event handling module 134 may be implemented as part of another node within the communication network, as selected by a skilled person. Most generally, the invention can be implemented in any nodes that generate events; or in any nodes that aggregate events, or in any nodes that process events for example in the communication system of the exemplary embodiment. In addition, in some embodiments the event processing is distributed across several nodes within a communication system. Other embodiments may be implemented in terminals or monitoring equipment, for example to monitor service quality events from set top boxes or service quality monitors.

The event handling module 134 of the exemplary embodiment receives mobility management events 136 from core network nodes and receives performance events 138 from radio access network nodes. The event handling module 134 will be described in more detail with reference to the accompanying drawings.

Figure 2:
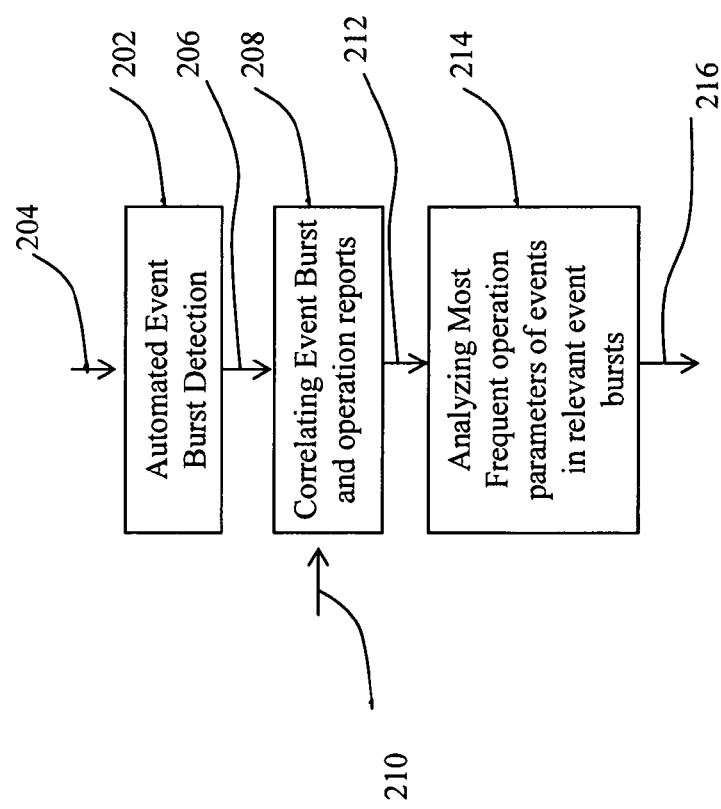
FIG. 2 is a flow chart showing steps of a method in accordance with one embodiment.

FIG. 2 is a flow chart showing the steps of a method 200 that may be implemented in event handling module 134 in accordance with embodiments of the invention.

In a first step 202 of method 200 shown in FIG. 2, events 204 are received and automated event burst detection 202 is carried out on the events 204 to generate event burst records 206. In the exemplary embodiment the events 204 may comprise the mobility management events 136 and the performance events 138. The automated event burst detection will be described in more detail with reference to FIG. 6.

In a second step 208 of method 200 shown in FIG. 2, the event burst records 206 generated in step 202 are correlated with operation reports 210 to determine the relevant event burst records 212. In this embodiment the operation reports may relate to network operation reports and/or to user service reports. The step of correlating the event burst records 206 with the operation reports 210 will be described in more detail with reference to FIGS. 8 and 9.

In a third step 214 of method 200 shown in FIG. 2, the relevant event burst records 212 are analysed to determine the most frequent operation parameters among the events of the relevant event bursts. In this embodiment the possible causes 216 of the operational change, for example a user service problems, is generated and output, as will be described in more detail in the following description.

In the exemplary embodiment, events 204 comprise the mobility management events 136 from core network nodes and performance events 138 from radio access network nodes comprise.

Although in the exemplary embodiment shown in FIG. 2 the steps 202, 208 and 214 are carried out in the event handling module 134, in other embodiments the processing of events in steps 202, 208 and 214 may be distributed across several nodes of the communication system. In particular, processing of events in steps 202, 208 and 214 may be carried out in one or more of a central node in the communication system; a local node where 136 and 138 are generated, an event handling module 134 or any other event processing application in any combination.

In embodiments with distributed processing of events, instead of transmitting each event to an event handling module 134, the events may be processed closer to their point of origin, resulting in a reduction in the volume of events transmitted across communication links during event processing.

The exemplary embodiment may be implemented in any manner as seems appropriate to a skilled person. For example, steps 208 and 214 may also be executed locally and only the relevant event burst records (212) for step 208 or even the found causes 216 are collected.

Figure 3:
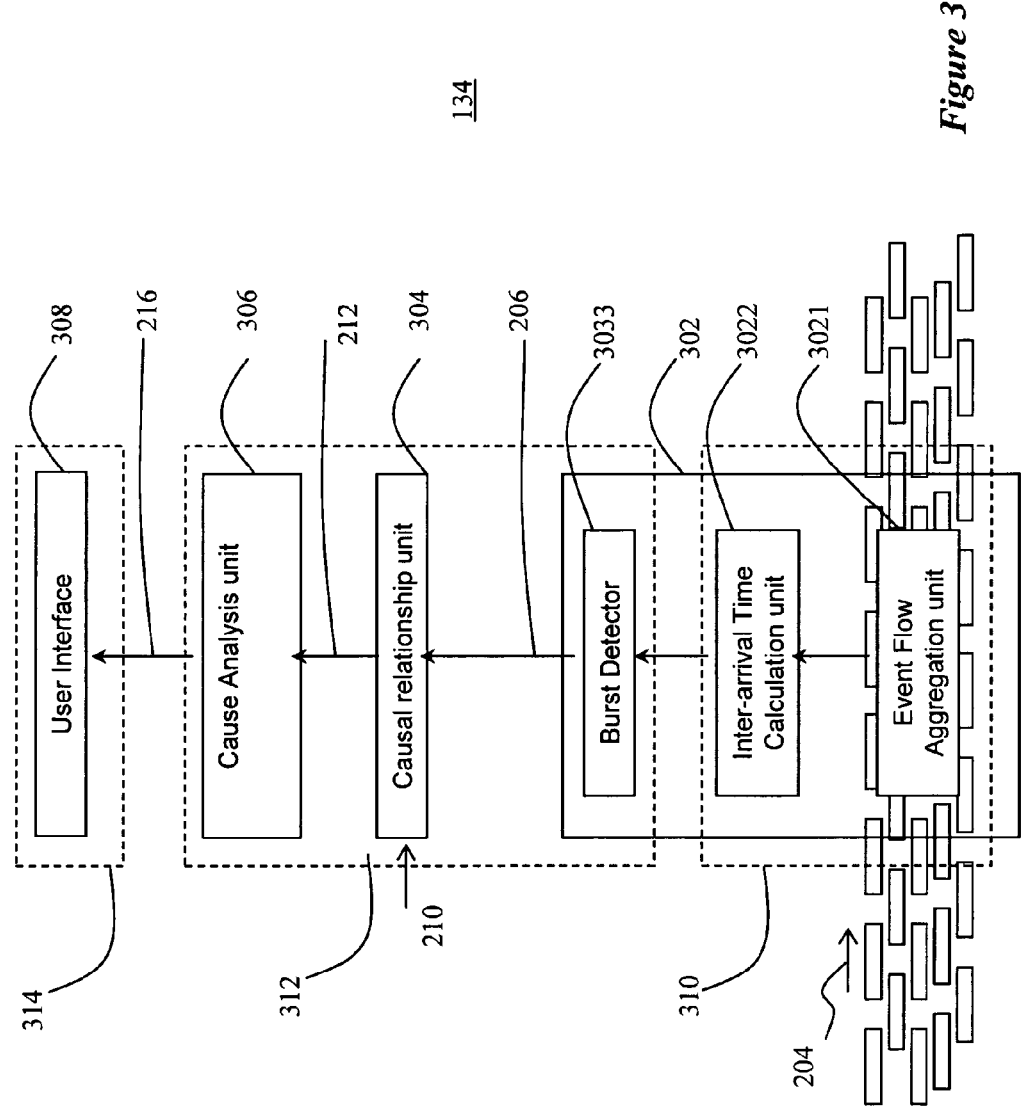
FIG. 3 is a block diagram showing an exemplary analyzer in accordance with an embodiment.

FIG. 3 shows an exemplary implementation of event handling module 134 suitable for implementing the method shown in FIG. 2. The events 204, event burst records 206, operation reports 210, relevant event burst records 212, and possible causes 216 of the operational changes present in the method of FIG. 2 are also present in FIG. 3, and have been given the corresponding reference numerals.

A burst analysis unit 302 is provided for receiving events records 204, and carrying out automated event burst detection on the events 204 to generate event burst records 206. In the exemplary embodiment, the burst analysis unit 302 comprises an event flow aggregation unit 3021 arranged to receive the events records and aggregate the events into event flows of interest; an inter-arrival time calculation unit 3022 coupled to the event flow aggregation unit 3021; and a burst detector 3033 coupled to the inter-arrival time calculation unit 3022.

In the mobile radio system of the exemplary embodiment, events are collected from multiple nodes of the network, either in Remote Operations (ROP) files or as data streams, and fed into the burst analysis unit 302. The burst analysis unit 302 of the exemplary embodiment automatically identifies the burst behaviors of the events and outputs burst records 206. The detailed operation of the burst analysis unit in an exemplary embodiment will be described hereafter in more detail with reference to FIG. 6.

Figure 3A:
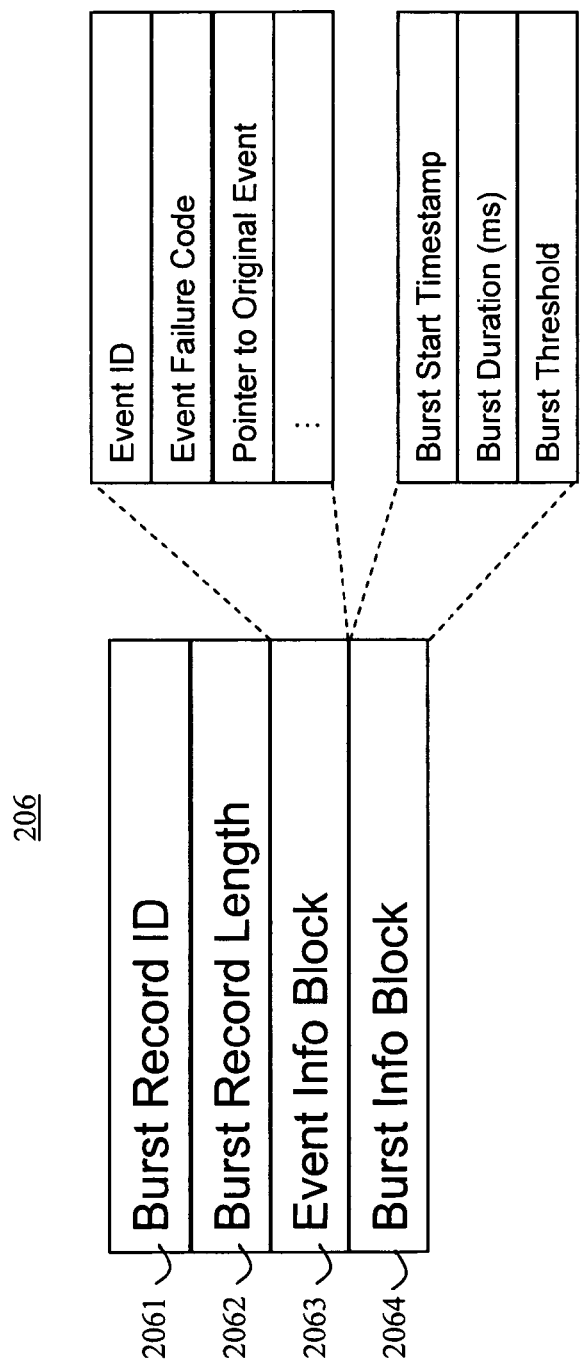
FIG. 3a shows an exemplary burst record in accordance with an exemplary embodiment.

An exemplary embodiment of a burst record 206 is shown in FIG. 3a. The exemplary burst record 206 of FIG. 3a comprises:
- a burst record identification (ID) field 2061: for identifying the burst record;
- a burst record length field 2061: for recording the length of the burst record;
- an event information block field 2063, for recording information about each of the events in the burst (based on grouping criteria of the event flow aggregation unit 3021 of FIG. 3), such as event identification (ID) or an array of event identification (ID)s, failure codes or other parameters (if present), and pointers to the original events if necessary, since the original events belonging to the burst may be buffered; and
- a burst information block 2064: for recording information about the burst, such as burst start timestamp and burst duration and burst threshold.

However, in other embodiments the event burst record 206 may contain more or less or different information to that described here, as selected by a skilled person.

A causal relationship unit 304 is provided and receives the event burst records 206 from burst analysis unit 302 and operation reports 210, for example user service problem reports or user service quality feedback from a service quality monitor (not shown). One example of such a service quality monitor is the Agama IPTV monitoring solution, but other service quality monitors may be selected by a skilled person. The event burst records 206 generated in step 202 are correlated with operation reports 210 to determine the relevant event burst records 212. The operation of the causal relationship unit 304 will be described in more detail in the following description with reference to FIGS. 8 and 9.

A cause analysis unit 306 is provided and receives relevant event burst records 212 from the burst correlation unit 304. The relevant event burst records 212 are analysed (either in parallel with burst identification process or afterwards) to determine the most frequent operation cause parameter among the events of the relevant event bursts. Finally, the causes of the user service problems 216 are identified by analyzing the frequency of different operation causes among those burst events which are correlated with service quality degradations.

The operation of the cause analysis unit 306 will be described in more detail in the following description.

In the exemplary embodiment a user interface 308 is provided to receive possible causes of the user service problems 216 for presentation to, or use by, a communication system user.

Some embodiments can be implemented purely in software modules, and other embodiments can be implemented in any suitable combination of hardware and software. The exemplary embodiment may be implemented in any manner as seems appropriate to a skilled person. In the exemplary embodiment shown in FIG. 3 the event flow aggregation unit 3021 and the inter-arrival time calculation unit 3022 are implemented in hardware 310. Similar to IP packet processing, the events are received and processed using a network card (with a processor and certain memory). In this hardware module, the events are matched based on event ID or other criteria, and aggregated into event flows (FIG. 3). The inter-arrival time for each event flow is calculated, using counters.

In the exemplary embodiment as shown in FIG. 3 the burst detector 3033, causal relationship unit 304, and cause analysis unit 306 are implemented in a first software module 312. In the exemplary embodiment as shown in FIG. 3 the optional user interface 308 is implemented as a second software module 314. The burst detector module 3033, implemented with software modules, reads the hardware counters to determine whether there are bursts. The rest of modules are implemented as software.

The automated event burst detection in accordance with the exemplary embodiment will now be described with reference to FIGS. 4-7 of the accompanying drawings.

In the exemplary embodiment, a burst in an event flow is identified if the received events of that event flow have a suddenly and significantly reduced inter-arrival time, and such situation lasts for a certain period.

A bucket filter model is used for event burst detection in accordance with an exemplary embodiment, which will be described with reference to FIGS. 4 and 5. Each bucket represents a data buffer which temporarily keeps records of events and event behaviors. In some embodiments, the data buffer may be implemented as a stack data structure.

Figure 4:
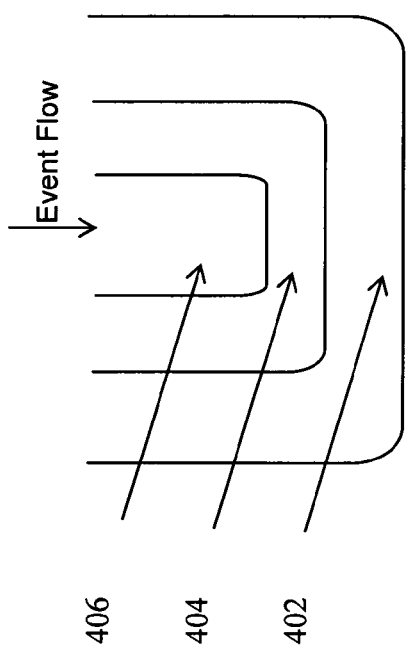
FIG. 4 illustrates a filter bucket model for event burst detection.

The exemplary burst filter model illustrated in FIG. 4 has three buckets, namely history bucket 402, burst bucket 404 and outlier bucket 406. Each event of the event flow is placed into one of the history bucket 404, the burst bucket 404 and the outlier bucket 406 as will be explained in the following description, depending on variations in the time interval between reception of events of the event flow. Criteria for determining the bucket into which an event should be placed may be determined from previous events, as will become clear from a consideration of the following description.

The inter-arrival time is the time interval between the arrival of one event and the arrival of the next event in the event flow, and is calculated in real-time for each event after the first in an event flow.

In some embodiments this may be achieved by recording an arrival timestamp of the previous event ($t_{n-1}$). The inter-arrival time of the incoming event can be calculated by subtracting the arrival timestamp of the previous event from that of the incoming event ($t_n$).

Thus, inter-arrivaltime$_{(n-1,n)}$=$t_n$−$t_{n-1}$

The reciprocal of the inter-arrival time can be used to provide an estimated arrival rate $\lambda_n$ for an event in the event flow.

$$\lambda_n = \frac{1}{inter\text{-}arrivaltime_{(n-1,n)}}$$

The calculated arrival rate $\lambda_n$ for a received event can be used to determine an expected arrival rate $\lambda$ for the next event in the event flow and the variance of the arrival rate $\Delta\lambda$.

There are a number of methods available to calculate the expected arrival rate $\lambda$, as will be appreciated by a skilled person. In one method a record of the historical event arrival behavior is maintained and the estimated arrival rate $\lambda_n$ of an event is found from an average of the arrival rates for previous events in the event flow.

In the exemplary embodiment an exponential moving average algorithm is used to as follows:

$$\lambda=\alpha\times\lambda+(1-\alpha)\lambda_n \quad 0<\alpha<1$$

Where:
$\lambda_n$ is the calculated arrival rate for a received event
$\lambda$ is an expected arrival rate for an event of that type
$\alpha$ is a pre-defined smoothing factor, which in one exemplary embodiment is:

$$\alpha = \frac{15}{16}$$

Similarly, the calculation of the variance of the arrival rate $\Delta\lambda$ may use a number of different methods in different implementations, as will be appreciated by a skilled person.

In the exemplary embodiment a revised exponential moving average algorithm is used as follows:

$$\Delta\lambda_n=|\lambda_n-\lambda|$$

$$\Delta\lambda=\beta\times\max(\Delta\lambda,\Delta\lambda_n)+(1-\beta)\times\min(\Delta\lambda,\Delta\lambda_n) \quad 0.5<\beta\le1$$

Where:
$\Delta\lambda_n$ is the variance of a received event
$\Delta\lambda$ is the expected variance of events of that event type
$\beta$ is a pre-defined smoothing factor; which in one exemplary embodiment is $$\beta = \frac{15}{16})$$

The calculated arrival rate $\lambda_n$ for a received event is compared with the expected arrival rate $\lambda$ and expected variance $\Delta\lambda$ using the following equations:

$$\frac{|\lambda_n - \lambda|}{\Delta\lambda} > \tau \quad \text{Equation 1.1}$$

$$\frac{|\lambda_n - \lambda|}{\Delta\lambda} > 2\tau \quad \text{Equation 1.2}$$

where $\tau$ is a pre-defined threshold factor: $\tau\ge1$ usually $\tau=1$ or 2).

If a calculated arrival rate $\lambda_n$ for an event satisfies equation 1.1, a potentially significant burst in event occurrence is occurring. However, such a burst may also be a noise, e.g. temporary increase of event arrival rate. This can be common in a mobile wireless system and factors like user equipment failures may trigger a temporary increase in the number of failure events. If it is temporary, such event behavior should not be detected as a burst in the burst detection step.

Figure 5:
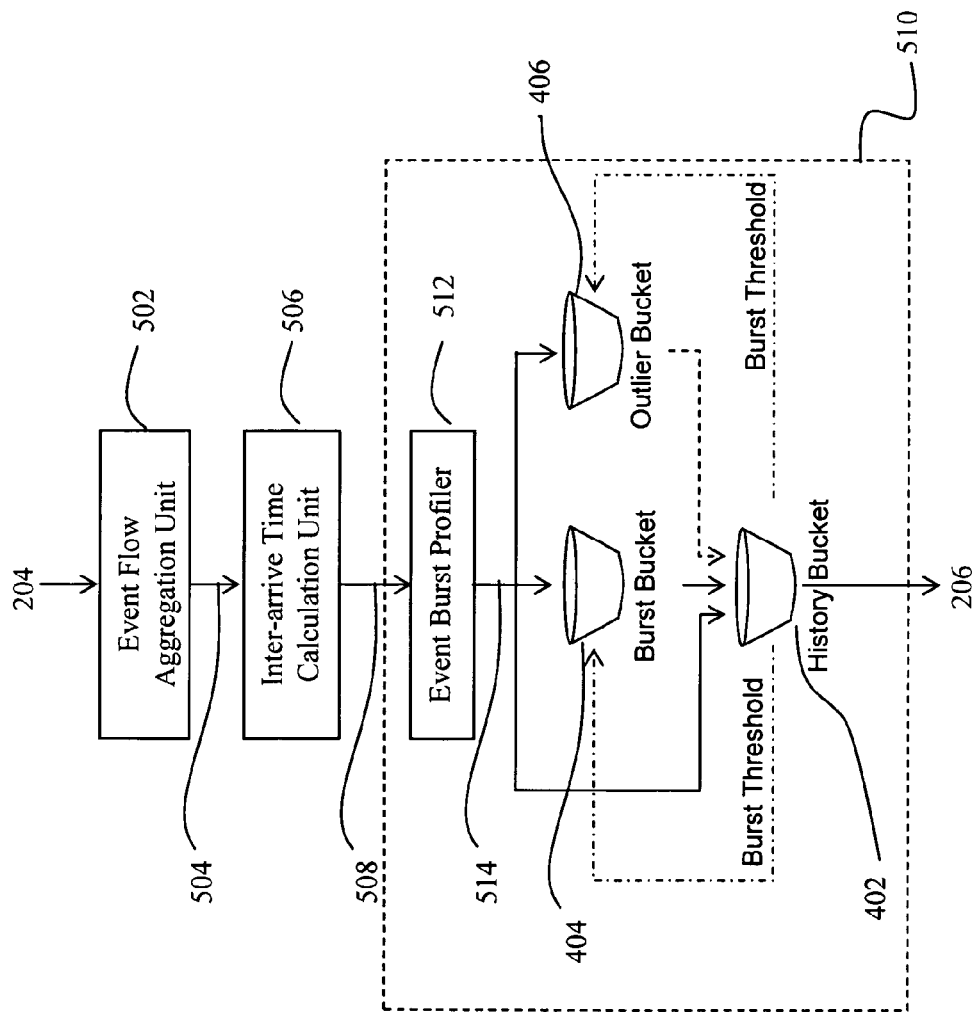
FIG. 5 is a data flow diagram showing automated burst detection for events in mobile radio systems in accordance with an exemplary embodiment.

FIG. 5 is a data flow diagram illustrating the use of the bucket filter model for event burst detection in accordance with an exemplary embodiment.

In FIG. 5 the events 204 are aggregated by an event flow aggregation unit 502 to form at least one aggregated event flow 504. The operation will be described in more detail with reference to step 602 of FIG. 6.

The inter-arrival time calculation unit 506 determines inter-arrival metrics such as the arrival rate $\lambda_n$ as described above for each received event in the event flow, resulting in event arrival behavior data 508.

Burst detector 510 corresponds generally with the burst detector 3033 of FIG. 3 and comprises an event burst profiler 512 and the history bucket 402, burst bucket 404 and outlier bucket 406.

An event burst profiler 512 receives the event arrival behavior data 508 and, as will be explained later with reference to FIG. 6, obtains current network load information (not shown in FIG. 5) and selects an event profile corresponding with the current network load information. The event arrival behavior 508 is then processed according to the event profile to form profiled event arrival data 514. The processing of event arrival data according to event profiles will be described in the following description with reference to FIG. 6.

The profiled event arrival behavior data 514 is then applied to the history bucket 402, burst bucket 404 and outlier bucket 406 depending upon a comparison of the calculated arrival rate $\lambda_n$ or an event with the expected arrival rate $\lambda$ and expected variance $\Delta\lambda$ for an event in the event flow, using equations set out above, as will be explained in more detail with reference to FIG. 6.

The function of the history bucket 402 is to determine the normal state of the event occurrence. The expected arrival rate $\lambda$ and the variance of the arrival rate $\Delta\lambda$ are the major properties of the bucket. Depending on the methods of calculating these properties, the bucket may store some historical events and event occurrence behavior. For example, if moving average is used in calculation, the last k (burst) event needs to be stored. In the exemplary embodiment using the exponential moving average algorithm discussed above, no historical events need to be stored.

The function of the burst bucket 404 is to cache potential burst events. If the calculated arrival rate $\lambda_n$ for an event satisfies the equation 1.1 above but not equation 1.2 above, the event and the calculated arrival rate are pushed (e.g. recorded) into this bucket.

The function of the outlier bucket 406 is to cache potential noise/outlier events. If the calculated arrival rate $\lambda_n$ for an event satisfies the equation 1.2 above, the event and the calculated arrival rate are pushed (e.g. recorded) into this bucket.

It should be noted that the expected arrival rate $\lambda$ and expected variance $\Delta\lambda$ for an event in an event flow used in equations 1.1 and 1.2 are determined from the previous events of that event flow allocated to the history bucket 402, as will be explained with reference to FIGS. 6 and 7.

Once an event burst has been detected, as will be explained with reference to FIGS. 6 and 7, the corresponding event burst records 206 can be output.

An exemplary event burst detection method will now be described with reference to FIG. 6.

Figure 6:
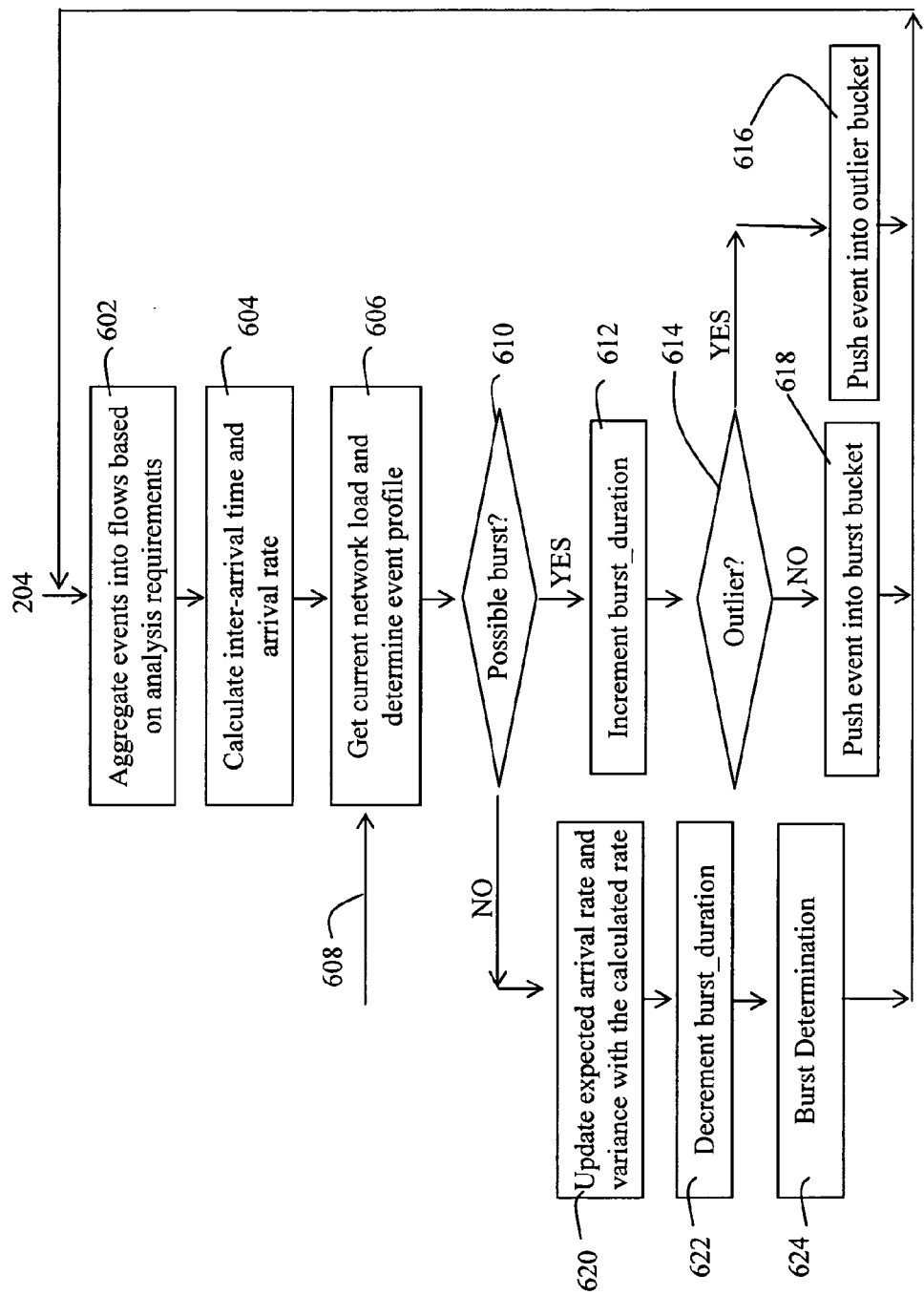
FIG. 6 is a flow chart showing a filter bucket model for event burst detection.

In step 602 of FIG. 6 events 204 are parsed according to pre-defined event format templates to determine events of interest, and then the events of interest are aggregated into event flows based on analysis requirements. For example, if the operator needs to monitor burst behavior of mobility management, only mobility management events would be considered in the burst detection. This parsing activity may be done for example by setting event filters to select only received events of a desired event type to form an event flow. Alternatively or additionally, in other embodiments this parsing activity may be done for example by setting event filters to select only received events with a particular parameter, for example a particular failure code, to form an event flow. The event filter criteria can be any event fields, or a combination of multiple event fields.

Figure 11:
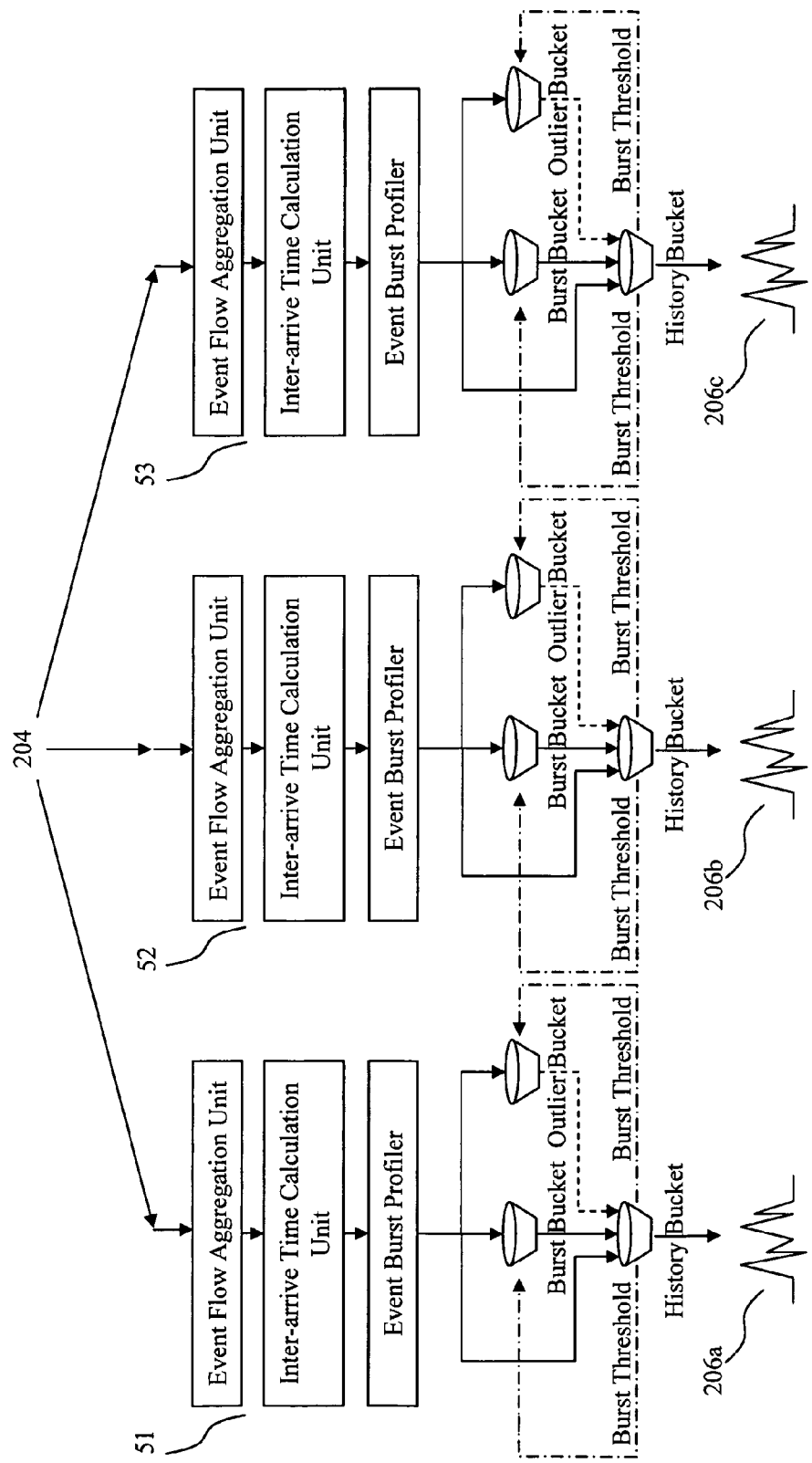
FIG. 11 illustrates the aggregation of events into a number of event flows in accordance with some embodiments.

FIG. 11 illustrates the parsing and aggregating of a stream of events 204 into a number of different event flows 206a, 206b, 206c by means of bucket filter models 51, 52 and 53. Different criteria may determine the events selected for each of the event flows 206a, 206b, 206c. For example one of the event flows may be formed by all events having a particular failure code as an event parameter.

Next, the inter-arrival time of the monitored event flow is calculated in step 604. The inter-arrival time is the amount of time between the arrival of one event and the arrival of the next event in the event flow, and is calculated for each subsequently received event.

Before the burst status is examined, in the exemplary embodiment a network load profile for the event is determined in step 606. Here it is assumed that event occurrence is closely related to network load conditions, i.e. the number of active users in the network. Therefore it is to be expected that event arrival rate would increase when more users attach to the network and consume the services, and decrease when users go to idle status or leave the network or the services. In view of the variation in the expected or normal event arrival rate depending on network load, in some embodiments the operator define two or more event profiles based on network load conditions.

In some embodiments the operator may monitor and measure the load of the network, in some embodiments for example by determining the number of active users of the network. In the exemplary embodiment network load data 608 provides a measurement of the load of the network. In some embodiments network load data 608 may be mobility management events 136 from core network 104 shown in FIG. 1. In some embodiments the mobility management events 136 from core network 104 may be SGSN mobility management events.

In addition, the operator may further estimate the load distribution or probability density, as will be known to a skilled person, and classify the network load into, for example, three different conditions:
high network load condition: 70,000~90,000 (maximum) active users;
low network load condition: less than 10,000 active users;
normal network load condition: number of active users between 10,000 and 70,000

Clearly the number of different load conditions selected, and the thresholds used for categorizing the load may be selected by a skilled person as appropriate for the system in different embodiments.

To determine the processing profile, the burst detector determines the current network load, and then matches the current network load against the pre-defined profiles. The event is further processed under each profile. Thus for example each profile may have its own burst thresholds and the corresponding buckets. For example, if the current network load is 3000 users, a match with a low load condition might be made, based on the pre-determined threshold as set out above. Then the burst behaviour is compared to the thresholds of low load conditions to determine if it is a burst.

In step 610 it is determined whether the event might be part of a burst by comparing the arrival rate $\lambda_n$ for a received event is compared with the expected arrival rate $\lambda$ and expected variance $\Delta\lambda$ of an event of that event type using equation 1.1 discussed above in the exemplary embodiment with reference to FIG. 3.

In response to a positive determination, step 610—yes, a burst_duration counter is incremented in step 612, and in step 614 it is determined whether the event is a potential outlier event by comparing the arrival rate $\lambda_n$ for a received event with the expected arrival rate $\lambda$ and expected variance $\Delta\lambda$ of an event of that event type using equation 1.2 discussed above in the exemplary embodiment with reference to FIG. 3.

In response to a positive determination, step 614—yes, the event is determined to be a potential outlier event and is put in the outlier bucket 406 in step 616.

In response to a negative determination, step 614—no, the event is determined to be a potential burst event and is put in the burst bucket 404 in step 618.

For as long as the successive events 204 are determined to be potentially part of a burst in step 610 the burst_duration counter will continue to be incremented in step 612. In response to a negative determination in step 610—no, the expected arrival rate $\lambda$ and expected variance $\Delta\lambda$ of an event of that event type are updated in step 620, and the burst_duration counter is decremented in step 622. Finally a burst determination as will be explained further with reference to FIG. 7, is made in step 624.

As will be apparent from a consideration of FIG. 6 if the calculated event arrival rate $\lambda_n$ of an event satisfies equation 1.1, the burst_duration variable is incremented (by a constant; 1 by default) in step 612. Furthermore if the calculated event arrival rate $\lambda_n$ doesn't satisfy the equation 1.1, the burst_duration variable is decremented (by a constant; 1 by default) in step 622.

The burst determination in step 624 will be explained further with reference to FIG. 7, which shows in more detail the processing carried out in step 624 of FIG. 6 in the exemplary embodiment to further determine whether a burst is temporary or not.

Figure 7:
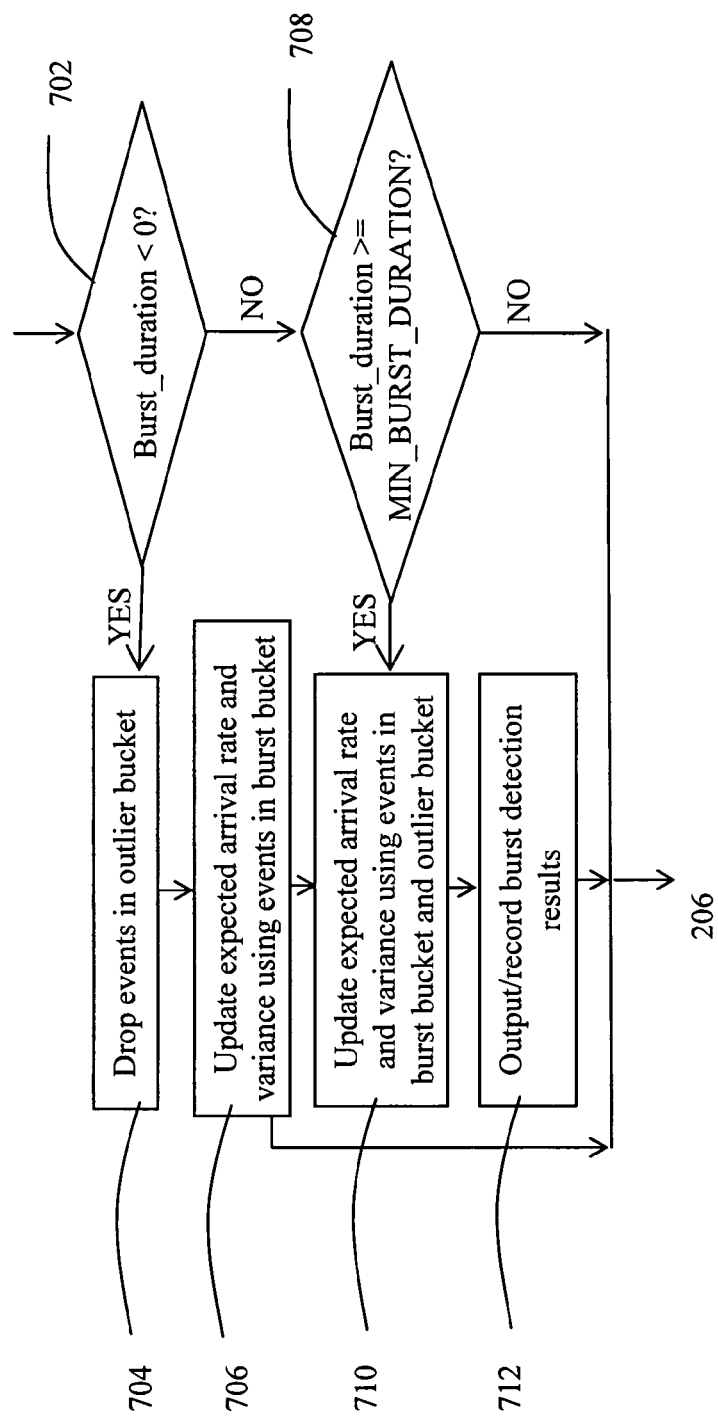
FIG. 7 is a flow chart showing steps in a method of automated burst detection for events in mobile radio systems in accordance with an exemplary embodiment.

With reference to FIG. 7, as a first step, it is determined whether the burst_duration variable has a value less than zero, in step 702. If the burst_duration variable becomes negative, step 702—yes, then cached events in the outlier bucket are thought to be noise and may be ignored in step 704. In this situation only the events cached in the burst bucket are used to update the expected event arrival rate $\lambda$ and expected variance $\Delta\lambda$ in step 706.

If the burst_duration variable has a value greater than or equal to zero, in step 702—no, it is determined whether the burst_duration variable has a value greater than or equal to a pre-defined value MIN_BURST_DURATION, in step 708. If the burst duration becomes larger than (or equal to) a pre-defined value MIN_BURST_DURATION step 708—yes, it is confirmed that there exists an event burst occurrence. The events cached in both burst bucket 404 and outlier bucket 406 are used to update the expected arrival rate $\lambda$ and expected variance $\Delta\lambda$ in step 710, and the details about the burst, including event ID for the events within the burst, burst starting timestamp and burst duration, are recorded in step 712. The event burst record 206 can then be output.

In some embodiments, the event burst records 206 are further analyzed to identify the causal relationships between event bursts. In some embodiments this is achieved by calculating the causal probability between event bursts from the event burst records 206.

Different algorithms to determine a causal relationship between event burst records may be employed in different embodiments, as will be known to a skilled person.

Figure 8:
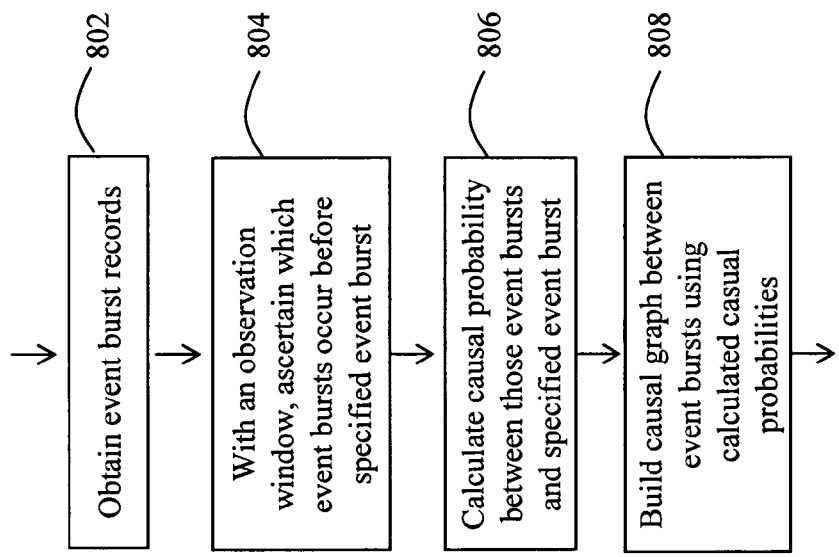
FIG. 8 shows a method of automated correlation between events.

FIG. 8 shows an exemplary method of determining a causal relationship between event bursts employed in some embodiments.

In step 802 the event burst records 206 are obtained.

In step 804, with the use of an observation window, it is ascertained which event bursts occur before specified event burst. A suitable length of window may be selected by the skilled person in different embodiments.

In an exemplary embodiment, the total number of bursts of a specified event $e_1$ is determined by examining the whole burst records ($N_{e_1}$). The number of times that an ascertained event burst (event $e_2$) co-occurs before the specified event burst (event $e_1$) within a pre-defined observation window $w_e$, for example 30 seconds, is also determined ($N_{e_2 \to e_1}$). In this context an ascertained event burst (event $e_2$) is deemed to co-occurs before the specified event burst (event $e_1$) when the start time of the ascertained event burst (event $e_2$) occurs before the start time of the specified event burst (event $e_1$)

In step 806, the causal probability between these two events $P_{e_2 \to e_1}$ is calculated through dividing the number of co-occurrences $N_{e_2 \to e_1}$ by the total number of bursts $N_{e_1}$.

$$P_{e_2 \to e_1} = \frac{N_{e_2 \to e_1}}{N_{e_1}}.$$

Figure 10:
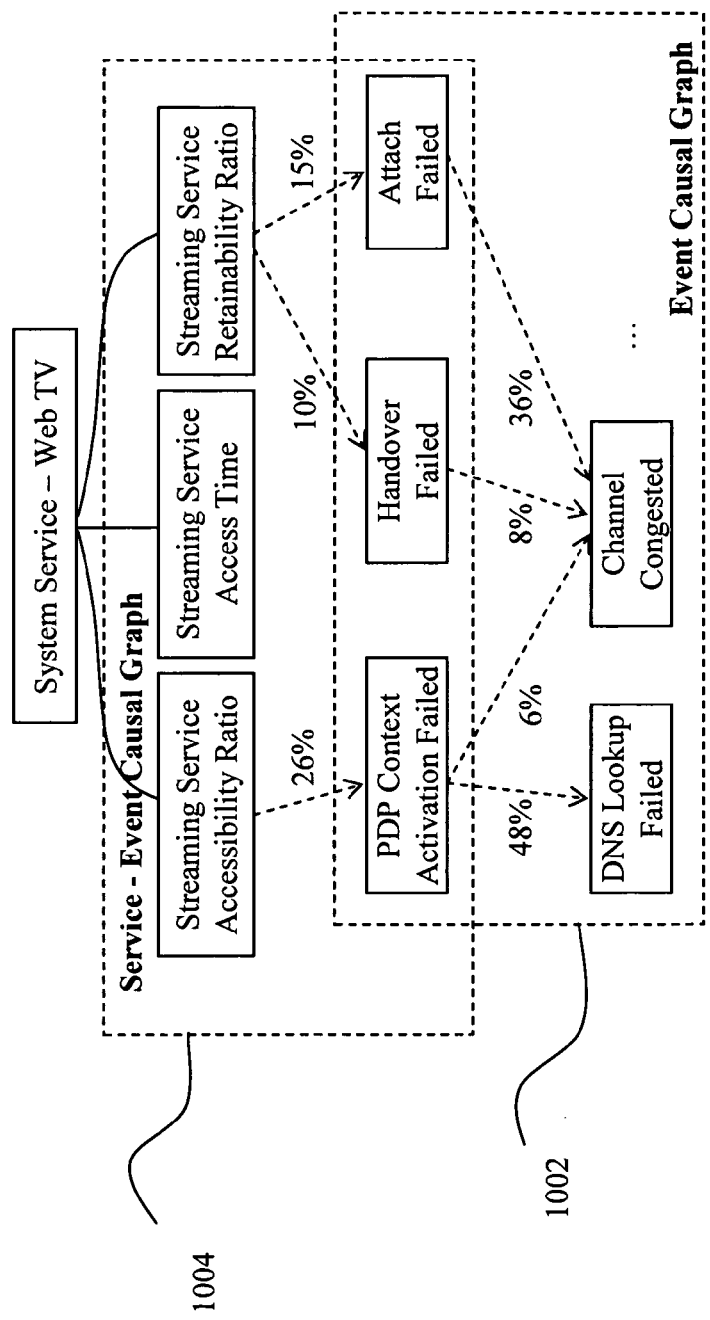
FIG. 10 illustrates causal graphs showing causal relationships between events and between events and service

In step 808 a causal graph between event bursts using calculated causal probabilities is built. A directed link can be added to the causal graph (as shown in FIG. 10) together with the calculated causal probability. As will be clear to a skilled person, the causal probabilities are not fixed but are dynamically updated as the causal probabilities are periodically updated.

An exemplary causal graph shown in FIG. 10 will be described later.

The event burst records 206 are further analyzed to identify the causal relationships between service quality and event bursts. In some embodiments this is achieved by calculating the causal probability between service quality and event bursts from the event burst records 206 and service quality reports for those events.

Figure 9:
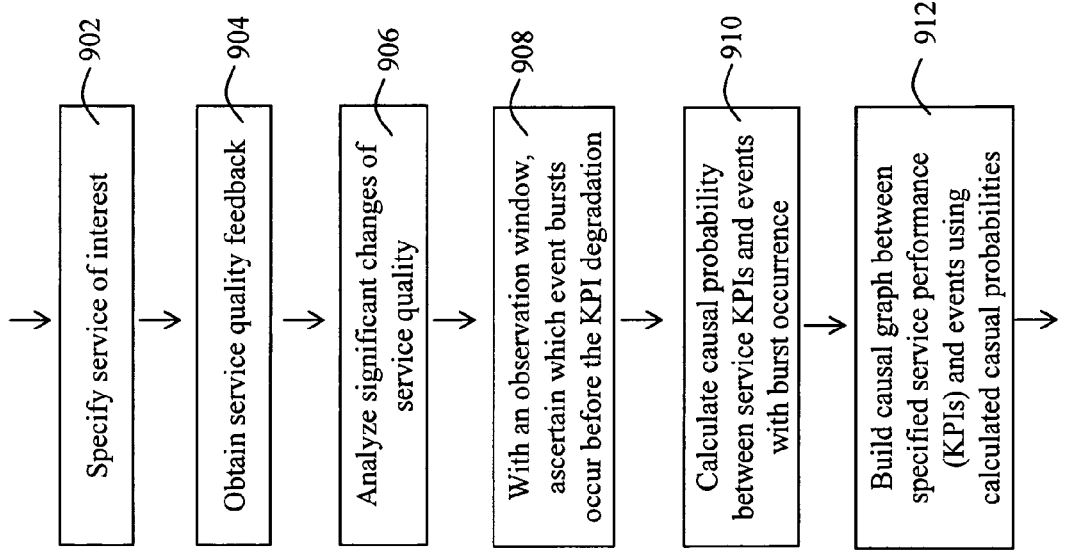
FIG. 9 shows a method of automated correlation between user service performance and events.

With reference to FIG. 9, in a first step 902 the service of interest is specified.

Service quality feedback for the service of interest is obtained in step 904. The service quality feedback may be any reports or measurements of a specified user service. In one embodiment this may be provided by Agama TV monitoring arrangement (http://www.agama.tv/analyzer.html) although different embodiments may make use of different reports or measurements of a user service, as will be familiar to a skilled person.

In step 906 the service quality feedback is further analyzed to determine any significant changes of the service quality, for example by analyzing any significant degradation in service quality Key Performance Indicators (KPIs). Methods of determining changes in service quality may be selected by a skilled person in different embodiments. For example one such method would be threshold based, e.g. selecting those quality changes (for example, packet loss increases) exceeding a pre-defined threshold (for example 5%) as significant degradations.

In step 908 of the exemplary method shown in FIG. 9, with an observation window $w_s$, it is ascertained which event bursts occur before the KPI degradation. The length of the observation window may depend on the reporting or measurement intervals of the service quality feedbacks and also the buffer size of the user equipments, and may be selected by a skilled person for different embodiments. In some embodiments a suitable default value for $w_s$ is 5 minutes. However, it is possible in some embodiments to use machine learning techniques and training data to determine the value of this observation window.

The causal probability between an event $e_1$ and the degradation of a specified service KPI s-$KPI_1$ (such as retainability ratio) is calculated (e.g. $e_1 \rightarrow e_{s\text{-}KPI_1}$). There are different algorithms to determine the causal relationship between two entities that may be selected by a skilled person. In an exemplary method the total number of degradation occurrences of s-$KPI_1$ (as experienced by end users) ($N_{s\text{-}KPI_1}$) is calculated by examining the service quality feedbacks. The number of times that an event burst of $e_1$ co-occurs before the degradation (e.g. $e_{s\text{-}KPI_1}$) within a pre-defined observation window $w_s$ is also determined $$(N_{e_1 \rightarrow e_{s\text{-}KPI_1}}).$$

In step 910 the causal probability between service KPIs and events with burst occurrence is calculated. The causal probability $$P_{e_1 \rightarrow e_{s\text{-}KPI_1}}$$

between the service KPI s-$KPI_1$ degradation and the event burst of $e_1$ may be calculated. In some embodiments this is achieved through dividing the number of co-occurrences $$N_{e_1 \rightarrow e_{s\text{-}KPI_1}}$$

by the total number of degradation occurrences $N_{s\text{-}KPI_1}$.

$$P_{e_1 \rightarrow e_{s\text{-}KPI_1}} = \frac{N_{e_1 \rightarrow e_{s\text{-}KPI_1}}}{N_{s\text{-}KPI_1}}$$

In step 912 a causal graph between specified service performance, for example KPIs) and events is built using calculated causal probabilities A directed link can be added to the causal graph (as shown in FIG. 10) together with the calculated causal probability. As will be clear to a skilled person, the causal probabilities are not fixed but are dynamically updated as the causal probabilities are periodically updated.

An exemplary causal graph generated for a Web TV system using embodiments described above with reference to FIGS. 8 and 9 is shown in FIG. 10. The calculated causal probabilities between event bursts are shown in the event causal graph 1002 and the calculated causal probabilities between specified service performance and events is shown in the service-event causal graph 1004.

In some embodiments bursts of events of interest are identified through automated event burst detection described above. Through automated correlation between user service performance indicators and the event bursts, the causal relation between service performance and events is built so that the events causing service performance degradation are identified.

Thereafter, the causes of the events in an event burst causing service performance degradation are analyzed, so as to disclose the potential root causes of the service problems. In this context it is noted that event parameters such as failure codes and sub failure codes may be defined for events to help troubleshooting the network. Such information is unique to events of mobile radio networks and useful in the context of cause analysis of network problems.

It is noted that merely finding the most frequent events with certain failure codes among all types of events is not useful, since the occurrence of events depends on a number of factors, such as network load and event nature, for example.

Thus after the events in event bursts that are relevant to or contribute to service problems have been identified, the most frequent failure causes inside the burst occurrence of the events are analyzed.

Based on the event burst records (event IDs in the event information block 2063 and burst start timestamp in burst information block in FIG. 3*a*), all of the events that participate in a burst can be obtained. In one embodiment, the burst records 206 are stored in a database and the events participating in a burst can be obtained from the burst records 206 by querying an event database as will be familiar to a skilled person.

Now the failure causes of the burst need to be identified. In some embodiments, the event flow aggregation unit 3021 may use wildcards to aggregate different types of events into the same event flow, for example, aggregating all of the events with the same failure code. So the burst records may contain events of different types.

The solution to this problem is implementation dependent and may be selected by the skilled person in different embodiments. The most straightforward approach is to count the frequency of every possible cause (based on event failure code, or cause codes, of the events), and choose the top k failure causes. However, such an approach involves a high memory cost and low processing speed and may not be efficient in some embodiments.

In an exemplary embodiment the following algorithm may be used to find the top k failure causes for events in and event bursts:

```
FindMostFrequentK-Causes
    causeSet=∅                        // causeSet: most frequent k causes
    for each event e_i in the burst
        cc_i = e_i → causeCode;       // Obtain cause code cc_i of event e_i
        if cc_i ∈ causeSet
            f_{cc_i} = f_{cc_i} +1;    // f: frequency array for each cause code
        else if |causeSet| < k
            causeSet = causeSet ∪ {cc_i};
            f_{cc_i} = 1;
        else
            find cc_j ∈ causeSet, satisfying f_{cc_j} is lowest;
            causeSet = causeSet / {cc_j};
            causeSet = causeSet ∪ {cc_i};
            f_{cc_i} = f_{cc_j} +1;
```

In this exemplary algorithm:
the cause code associated with each event in the burst is examined in turn;
if the cause code already exists in a set of cause codes, the frequency count of the cause code is incremented by 1;
if the cause code does not yet exist, and the number of cause codes already in the set of cause codes is smaller than k, the new cause code is inserted into the cause code set;

if the cause code does not yet exist, but there are already the maximum k cause codes in the cause code set, the cause code in the cause code set with the lowest frequency count is replaced with the new cause code; once the event code of all events in the burst have been examined in turn, the algorithm returns the most frequent k causes of the events in the burst of interest.

Thus a progressive event analysis can establish the root causes of service problems.

As will be appreciated by a skilled person, embodiments of the invention employ complex event processing concepts and enable real-time processing of events as they occur, without a requirement to retain event information and process state. Advantages provided by at least some embodiments of this invention include:

Automation: rules or pre-defined event patterns are not used to detect event anomaly so problem diagnosis is fully automated with only some pre-defined parameters.

Accuracy: the burst based approach of embodiments captures an anomalous status of the systems more accurately than computing failure ratio as described above. Such information is much more useful in troubleshooting service problems than ratios. Moreover, event profiling helps improve the accuracy in detecting event bursts.

Simplified operation: events are summarized based on their burst status compared to counter based approaches. The operator only needs to focus on these event bursts, which may indicate anomaly network status, instead of all of the events reflecting normal network states.

Significantly reduced storage space and analysis overhead: compared with existing solutions that collect and store every event, the proposed solution only stores the events with burst occurrence (e.g. event burst records) and events without burst occurrence can be stored in an abstract or compressed way. Methods of storing event information in this way will be known to a skilled person and will not be explained in more detail. This significantly reduces the overhead of storing and analyzing events and provides a solution for life-time storage of event records which are used for root cause analysis.

Significantly reduced overhead of transporting events through the network to the management system: the automated event burst detection (step 202) may be carried out locally, e.g. in the nodes or near the nodes where the events are generated. Thus, instead of transporting every single event, the event burst records 206 (or the relevant event burst records 212, or the found causes 216) may be transported through the network to the further processing units (steps 208 and/or 214), or any other event based systems. This significantly reduces the amount of data transferred.

Processing/parsing performance: there is no need to decode full details of an event if no burst behavior has been detected and so embodiments of the invention may be implemented using relatively little memory for execution of the method. Parsing can be done without processing bottleneck, which leads to a scalable implementation.

Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of analysis of operation of a communication system using events representing activity in the system, the method comprising the steps of:
   detecting bursts of events by:
      receiving a plurality of events;
      parsing the plurality of events according to a pre-defined event format template in order to determine at least one event of interest;
      aggregating the at least one event of interest into at least one event flow based on an aggregation criteria;
      selecting a pre-defined processing profile from a plurality of pre-defined processing profiles based on a comparison of a current network load of the communication system with one or more thresholds;
      placing one or more of the at least one event of interest from the at least one event flow into a burst bucket based on the pre-defined processing profile; and
      detecting a burst of events for one of the at least one event flows based on a burst status of the at least one event of interest and a burst duration value of the one of the at least one event flow, wherein the burst status and the burst duration value are determined based at least on the one or more event of interest placed in the burst bucket;
   using the detected bursts of events and system operation information in a causal relationship processing step to identify at least one significant event burst causing change in system operation; and
   determining causes of the change in system operation from information associated with events within the significant event burst.

2. The method of analysis as claimed in claim 1 where the events are aggregated into the at least one event flow on the basis of a parameter of an event.

3. The method of analysis as claimed in claim 1 in which the step of detecting bursts of events comprises the step of identifying a received event in an event flow as part of a burst depending on an arrival time of the received event and an expected arrival time and an expected variance in expected arrival time of events in the event flow.

4. The method of analysis as claimed in claim 3 in which the arrival times of a plurality of received events in an event flow are used in a step of determining an expected arrival time for the next event of the event flow and an expected variance in expected arrival time for events in the event flow.

5. The method of analysis as claimed in claim 1 in which the existence of a burst of events in an event flow is determined only after a threshold number of received events are identified as a part of a burst.

6. The method of analysis as claimed in claim 1 comprising the step of applying event profiles based on network load to an event arrival behavior.

7. The method of analysis as claimed in claim 1 wherein the causal relationship processing step comprises a step of calculating one or more causal probabilities between event bursts.

8. The method of analysis as claimed in claim 1 wherein the causal relationship processing step comprises a step of calculating a causal probability between service performance indicators and events with burst occurrence.

9. The method of analysis as claimed in claim 1 wherein the step of determining causes of the change in system operation comprises the step of determining failure and/or sub-failure parameters for events within the detected bursts of events.

10. The method of analysis as claimed in claim 1 wherein events are pre-processed in a first event processing element to detect bursts of events, and the resulting event burst records are transported across at least one communication link to at least one further event processing element for further analysis using a causal relationship processing step to identify at least one significant event burst causing change in system operation and a step to determine causes of the change in system operation from information associated with events within the significant event burst.

11. The method of analysis as claimed in claim 1 wherein events are pre-processed in at least one event processing element to detect bursts of events and to identify at least one significant event burst causing change in system operation using a causal relationship processing step, and resulting relevant event burst records are transported across at least one communication link to at least one further event processing element for further analysis to determine causes of the change in system operation from information associated with events within the significant event burst.

12. The method of analysis as claimed in claim 1 wherein events are pre-processed in at least a first event processing element to detect bursts of events and to identify at least one significant event burst causing change in system operation using a causal relationship processing step and to determine causes of the change in system operation from information associated with events within the significant event burst; and the causes of the change in system operation are transported to any event based application for further analysis.

13. An analyzer for operation of a communication system using events representing activity in the system, the analyzer comprising:
one or more processors coupled to a memory, the one or more processors operable to:
detect a plurality of events representing activity in the system, wherein the one or more processors operable to detect a plurality of events comprise one or more processors operable to:
receive a plurality of events;
parse the plurality of events according to a pre-defined event format template in order to determine at least one event of interest;
aggregate the at least one event of interest into at least one event flow based on an aggregation criteria;
select a pre-defined processing profile from a plurality of pre-defined processing profiles based on a comparison of a current network load of the communication system with one or more thresholds; and
place one or more of the at least one event of interest from the at least one event flow into a burst bucket based on the pre-defined processing profile;
detect bursts of events for one of the at least one event flow based on a burst status of the at least one event of interest and a burst duration value of the one of the at least one event flow, wherein the burst status and the burst duration value are determined based at least on the one or more event of interest placed in the burst bucket;
generate corresponding event burst records;
receive the event burst records and system operation information and use the event burst records and system operation information in a causal relationship processing step to identify at least one significant event burst causing change in system operation; and
determine causes of the change in system operation from information associated with events within the significant event burst.

14. The analyzer as claimed in claim 13 where the events are aggregated into the at least one event flow on the basis of a parameter of an event.

15. The analyzer as claimed in claim 13 in which detecting bursts of events comprises identifying a received event as part of a burst depending on an arrival time of the received event and an expected arrival time and an expected variance in expected arrival time of events of that event type.

16. The analyzer as claimed in claim 15 in which identifying a received event as part of a burst comprises applying event profiles based on network load to the event arrival behavior.

17. A communication system node having a memory and one or more processors coupled to the memory, wherein the one or more processors are operable to:
detect a plurality of events representing activity in the system wherein the one or more processors operable to detect a plurality of events comprise one or more processors operable to:
receive a plurality of events;
parse the plurality of events according to a pre-defined event format template in order to determine at least one event of interest;
aggregate the at least one event of interest into at least one event flow based on an aggregation criteria;
select a pre-defined processing profile from a plurality of pre-defined processing profiles based on a comparison of a current network load of the communication system with one or more thresholds; and
place one or more of the at least one event of interest from the at least one event flow into a burst bucket based on the pre-defined processing profile;
detect bursts of events for one of the at least one event flow based on a burst status of the at least one event of interest and a burst duration value of the one of the at least one event flow, wherein the burst status and the burst duration value are determined based at least on the one or more event of interest placed in the burst bucket;
generate corresponding event burst records;
provide event burst records;
receive the event burst records;
receive system operation information;
use the event burst records and system operation information in a causal relationship processing step to identify at least one significant event burst causing a change in system operation;
provide corresponding relevant event burst records;
receive significant event burst records; and
determine one or more causes of a change in system operation from information associated with events within the significant event burst records.

* * * * *